United States Patent [19]
Gay et al.

[11] Patent Number: 4,881,629
[45] Date of Patent: Nov. 21, 1989

[54] CLUTCH RELEASE BEARING

[75] Inventors: Christian Gay, Paris; Philippe Lassiaz, Boulogne, both of France

[73] Assignee: Valeo, Paris, France

[21] Appl. No.: 154,103

[22] Filed: Feb. 9, 1988

[30] Foreign Application Priority Data

Feb. 17, 1987 [FR] France .................. 87 02000

[51] Int. Cl.$^4$ .................................... F16D 23/14
[52] U.S. Cl. ...................... 192/98; 192/110 B; 384/495
[58] Field of Search .............. 192/98, 110 B; 384/495, 384/535, 611, 612; 267/161

[56] References Cited

U.S. PATENT DOCUMENTS

| | | | |
|---|---|---|---|
| 4,371,068 | 2/1983 | Billet | 192/98 |
| 4,555,190 | 11/1985 | Lederman | 384/495 |
| 4,608,741 | 9/1986 | Mallet | 192/98 X |

FOREIGN PATENT DOCUMENTS

| | | | |
|---|---|---|---|
| 2611558 | 9/1976 | Fed. Rep. of Germany | 384/612 |
| 2304828 | 10/1976 | France | 192/98 |
| 2559861 | 8/1984 | France | . |
| 2544429 | 10/1984 | France | . |
| 2577291 | 8/1986 | France | . |

*Primary Examiner*—Rodney H. Bonck
*Assistant Examiner*—Richard M. Lorence
*Attorney, Agent, or Firm*—Charles E. Brown; Charles A. Brown

[57] ABSTRACT

A clutch release bearing assembly of the kind comprising an operating element and a drive element which, by a flanged edge, is axially applied against a flange of the operating element. For the corresponding axial application and retention of the assembly, an elastic washer bears on the drive element; this elastic washer is provided with at least one lug having a transverse shoulder by which it is engaged with the operating element.

The lug of the elastic washer is prolonged beyond its transverse shoulder and at its end is provided with a right-angled flange. This facilitates the use of a tool which co-operates with the lugs during assembly of the release bearing. The arrangement is particularly applicable to self-centering clutch release bearings for automobile vehicles.

9 Claims, 2 Drawing Sheets

U.S. Patent    Nov. 21, 1989    Sheet 1 of 2    4,881,629
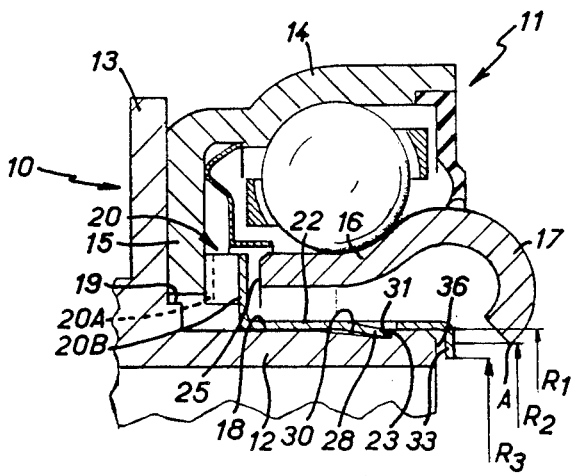
FIG. 1
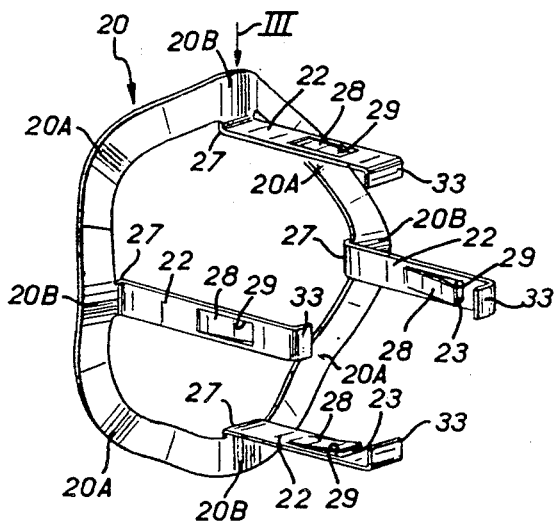
FIG. 2
FIG. 3
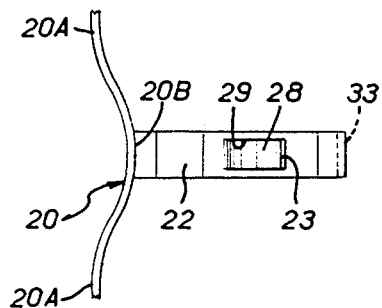
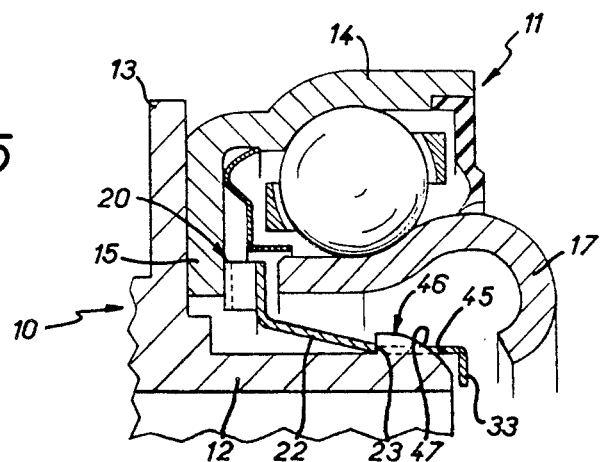
FIG. 5

CLUTCH RELEASE BEARING

BACKGROUND OF THE INVENTION

1. Field of the Invention

The present invention relates generally to clutch release bearings of the kind used for example in automobile vehicles.

A clutch release bearing of this kind usually comprises an operating element acted upon by a control device, which in practice is a clutch fork, and a drive element which, either directly or indirectly, is retained axially in abutment with the operating element, and which, under the action of the operating element, is designed to act on the declutching device of the clutch.

For the axial abutment of the drive element, the operating element carries a transverse flange, whilst the drive element is provided with a transverse flanged edge applied axially against this flange; this transverse flanged edge is hereinafter referred to as the applied flanged edge.

The present invention relates more particularly to an arrangement in which, for the axial application of the drive element to the operating element, an axially-acting elastic washer bears at one of its peripheries on the drive element, in practice on the applied flanged edge, and has on its other periphery at least one lug which, by a transverse shoulder thereon, is held by the operating element, which itself carries for this purpose a transverse shoulder turned axially in the opposite direction.

2. Description of the Related Art

A clutch release bearing of this kind is described for example in U.S. Pat. No. 4,637,506.

In this disclosure, the elastic washer, which comprises a plurality of lugs, is fitted first to the drive element, and the transverse shoulder which each of these lugs has, in order to cooperate with the transverse shoulder of the operating element, is formed directly by the free end of the lug.

Furthermore, the operating element comprises axially, in the usual manner, a sleeve from the surface of which its flange projects radially, and the transverse shoulder which it presents to interact with the lugs of the elastic washer is part of this sleeve.

This arrangement requires, during assembly, that once the drive element engages axially on the operating element such that its flanged edge rests against the flange of the operating element, an axial force is applied to the free end of the lugs of the elastic washer, by use of an appropriate tool, to compress this free end in order to carry it, against the resilience of the elastic washer, over the corresponding transverse shoulder of the sleeve of the operating element.

The tool comprises a plurality of a small rods, each of which respectively is brought to act on the free end of a lug of the elastic washer by means of a groove provided for this purpose on the surface of the sleeve of the operating element, the ribs, which two by two delimit the corresponding grooves, jointly forming at their opposite ends the transverse shoulder of this sleeve.

It is also essential that this tool can be inserted radially between the sleeve of the operating element and the drive element.

Since this drive element comprises, in the usual way, a bearing, to one of the races of which the applied flanged edge belongs, and the other race of which itself carries a flanged edge to act on the release device of a clutch, which latter flanged edge is hereafter for convenience called the operating flanged edge, and is directed radially in all directions whilst it can have, if required, a more or less rounded profile in axial section, it may be necessary for this operating flanged edge to be directed radially towards the axis of the assembly.

It is clear that in this case, the operating flanged edge can have only a limited radial extension and, moreover, the corresponding bearing must have a large diameter, since there must be an annular space sufficient to introduce a tool during assembly between its internal periphery and the external surface of the sleeve of the operating element.

In a general way, the object of the present invention is an arrangement allowing this difficulty to be surmounted in a very simple way and facilitating the application of a tool to the lugs of the elastic washer.

SUMMARY OF THE INVENTION

The object of the invention is a clutch release bearing, especially for an automobile, of the kind comprising an operating element which is intended to be subject to the action of a clutch control device, and a drive element which, either directly or indirectly, is applied axially against the operating element and which, under the action of the latter is intended to act on the release device of a clutch, the operating element carrying a transverse flange for the axial application of the drive element, whilst the drive element itself carries transversely, for axial application to the flange, a flanged edge, hereafter for convenience referred to as an applied flanged edge; and, in order to apply the drive element to the operating element, and to hold it axially with respect thereto, an elastic washer is provided bearing axially on the drive element and having at least one lug formed with a transverse shoulder by which it is retained by the operating element, the clutch release bearing being characterized in that the lug is prolonged beyond its transverse shoulder and is formed with a flange beyond the shoulder.

When the operating element comprises a sleeve, this washer flange extends axially beyond the edge of the sleeve in relation to the flange of this operating element.

The washer flange provides means by which a tool can act during assembly when it is necessary to exercise an axial force on the corresponding lug.

In consequence, this tool does not have to be inserted between the drive element and the sleeve of the operating element, so that when the flanged operating edge of the drive element is directed radially towards the axis of the assembly, the internal periphery of this flanged operating edge can extend in a circle having a radius less than that of the external surface of this sleeve.

It suffices that the free edge of the washer flange provided according to the invention on the lugs of the elastic washer itself extends in a circle with a radius less than that of the circumference of the internal periphery of the operating flanged edge of the drive element.

This washer flange is of equal value when the operating flanged edge is directed radially away from the axis of the assembly.

The same applies if the operating flanged edge of the ball bearing constituting the drive element belongs to the outer race, and thus the transverse shoulder, which the operating element carries to cooperate with a lug of the elastic washer, belongs to an axial washer flange which the operating element carries for this purpose on the outer periphery of its flange.

In effect, during assembly, the washer flange corresponding to the invention advantageously facilitates the insertion of the necessary tool and, in addition, it allows use of a very simple tool, which may even take the form of a simple plate.

BRIEF DESCRIPTION OF THE DRAWINGS

FIG. 1 is a partial view in axial section of a clutch release bearing according to the invention;

FIG. 2 is a perspective view of the elastic washer incorporated in this clutch release bearing;

FIG. 3 is a partial plan view, along arrow III of FIG. 2, of this elastic washer;

FIGS. 5, 6 and 7 are partial views in axial section each of which, like that of FIG. 1, relates respectively to an embodiment.

DESCRIPTION OF THE PREFERRED EMBODIMENTS

Figure 4A:
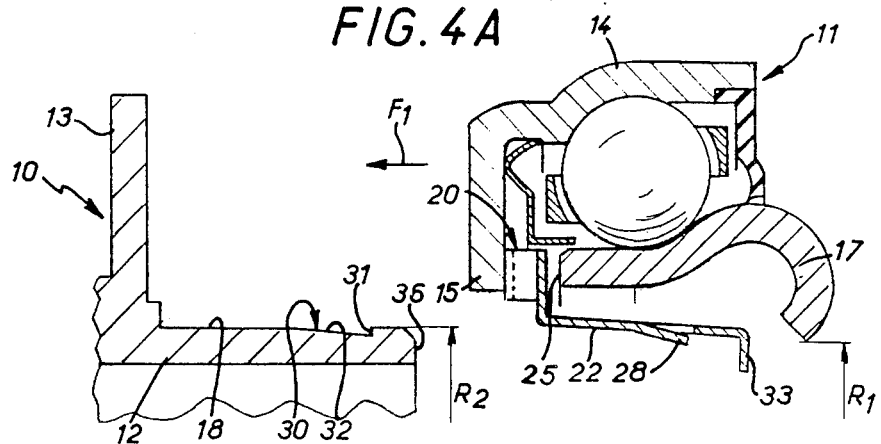
FIGS. 4A and 4B are partial views in axial section which, like that of FIG. 1, show two successive stages of assembly of the clutch release bearing according to the invention.

As illustrated in the Figures, a clutch release bearing assembly according to the invention comprises, an operating element 10, which is only partially visible in the Figures, and which is intended to be subjected to the action of a control device, which is not shown, and a drive element 11 which, either directly or indirectly, is axially applied against the operating element 10, and which, as a result of the action of the operating element is intended to act on the release device of a clutch, which is also not shown. The control device can be, in a customary way, either a clutch fork or a hydraulic controller.

The operating element 10 comprises axially a sleeve 12 intended to engage on any suitable support and guiding element, not shown, and, transversely, for the axial application of the drive element 11, a flange 13 which extends annularly around sleeve 12, projecting from the outer surface. The assembly is preferably made of synthetic material, by moulding.

The drive element 11 consists of a ball bearing, one of the races of which is adapted to be axially applied against the operating element 10, whilst the other is adapted to act on the release device of a clutch.

In the embodiments shown more particularly in FIGS. 1 to 6, it is the outer race 14 which is adapted to be applied against the operating element 10, and which carries transversely for this purpose, to engage flange 13, a flanged edge 15, here for convenience called the applied flanged edge, directed radially towards the axis of the assembly. Consequently, it is the inner race 16 which is adapted to act on the release device of a clutch.

The inner race 16 carries transversely for this purpose, at its free end, a flanged edge 17, here called for convenience an operating flanged edge, directed generally radially.

In the embodiments more particularly shown in FIGS. 1 to 5, this operating flanged edge 17 is directed generally radially in the direction of the axis of the assembly and, in axial section, it has a rounded contour. The inner periphery of this operating flanged edge 17 formed here by a ridge A, extends in a circle of radius R1 which is less than R2 of the circle in which the outer surface 18 of sleeve 12 extends.

In the embodiments shown, the axial application of drive element 11 and operating element 10 is made directly, by direct contact of the applied flanged edge 15 and the transverse flange 13.

In the case of a self-centering clutch release bearing, an annular clearance is left between the edge of the applied flanged edge 15 and a rib 19 which, at the inner periphery of flange 13, at its junction with sleeve 12 from which it issues, projects radially on the outer surface of sleeve 12.

For the axial application of drive element 11 to operating element 10, as well as to hold this drive element 11 axially in relation to operating element 10, an axially-acting elastic washer 20 is provided, which bears axially on drive element 11 and, more precisely, on the applied flanged edge 15 of this, and which also comprises at least one lug 22 with a transverse shoulder 23 by which it is held by operating element 10.

The elastic washer 20 thus used, extends in drive element 11, being situated axially between, on the one hand, the applied flanged edge 15 of that race of the bearing which is applied against flange 13, namely the outer race 14, and, on the other hand, the corresponding edge 25 of the other of the said bearing races, namely the inner race 16 in the embodiments shown in FIGS. 1 to 6.

This elastic washer 20 is an undulating washer, that is to say a washer having undulations axially displaced in relation to its middle plane, with, therefore, an alternation of portions 20A which, if the front of the clutch release bearing concerned is defined by its drive element 11 and its rear by its operating element 10, are axially behind the middle plane and extend axially in the direction of the applied flanged edge 15, and portions 20B which are axially advanced with respect to this middle plane, extending axially in the direction of the edge 25.

Consequently it bears on the applied flanged edge 15 by its undulations to the rear 20A, however the lug 22 which it carries stems from the advanced portion 20B of one of the undulations.

Preferably, the elastic washer 20 thus constituted comprises, distributed circularly, at least two lugs 22 and, in practice, four regularly distributed circularly at 90°, two by two. It comprises an equal number of undulations, the lugs 22 each stemming respectively from an advanced portion 20B of them.

Generally the lugs 22 of the elastic washer 20 extends axially, but preferably they can be elastically deformed radially, and, in their resting position, they converge slightly towards one another, drawing closer to the axis of the assembly concerned of the elastic washer 20 from which they stem.

In the embodiments more especially shown in FIGS. 1 to 4, these lugs 22, which are all identical, stem from the inner periphery of the elastic washer 20, each of them joining this at an elbow 27, rounded along its width, which forms its origin. These origins extend totally radially inside the inner periphery of the elastic washer 20.

The transverse shoulder 23 which each of the lugs 22 presents to be held by the operating element 10 is formed by the end edge of a tongue 28 elastically deformable radially, which lug 22 carries axially for this purpose. This tongue 28 is formed by means of a section 29 cut in a lug 22 and, in relation to its origin, which stretches generally circumferencially, it extends axially away from the elastic washer 20. At rest, the tongue gets progressively further away from this, reckoning from its origin, whilst drawing closer to the axis of the assembly.

Additionally, to cooperate with the transverse shoulder 23, the sleeve 12 has on its outer surface, a channel 30 of which the side which is axially turned towards flange 13 forms a transverse shoulder 31 suitable for such cooperation. This channel 30 in axial section has a V-shaped profile with, transversely in relation to the axis of the assembly, a vertical side, forming the transverse shoulder 31 and, sloping in relation to the said axis, an oblique side 32, FIG. 4A.

The channel thus made may extend in a continuous circle around the axis of the assembly but it can be divided into pockets at the rate of one per lug 22. In such a case, means of angular indexation are preferably provided between the elastic washer 20 and the sleeve 12.

According to the invention, each of the lugs 22 is prolonged beyond its transverse shoulder 23 and has beyond this a flange 33. In the embodiments shown, this flange 33 is a right angled flange, and it projects at the end of the respective lug 22.

It is disposed axially in front of the edge 36 of sleeve 12 and extends between this and the operating flanged edge 17; in the embodiments more particularly shown in FIGS. 1 to 6, it extends radially towards the axis of the assembly. The free edge of flange 33 extends on a circle with radius R3 less than that R1 of the circle on which the inner periphery of the operating flanged edge 17 extends.

From the outset, the elastic washer 20 equips drive element 11, stretching axially between the applied flanged edge 15 and the corresponding edge 25 of the interior race 16 of the ball bearing which it forms, and its lugs 22 are directed generally axially away from the flanged edge 15, FIG. 4A. Some axial engagement is subsequently made between drive element 11 and operating element 10, in the direction of arrow F1 in FIG. 4A.

During this engagement, the elastic washer 20 pushed by the inner race 16 of the ball bearing, makes contact, by its lugs 22, with sleeve 12 of the operating element, which constrains these lugs, making them bend elastically radially away from the axis of the assembly. Thus, as can easily be understood, the initial convergence of the lugs 22 facilitates the engagement of the elastic washer 20 with sleeve 12 whilst assuring its centering with respect to this.

It should be noted, however, that the elastic washer 20 can from the begining be centered in relation to drive element 11, for example by contact with the deflector usually equipping the ball bearing constituting this drive element 11, assuming, of course, that taking into account its intrinsic elasticity and/or that of the deflector, there is no risk in use of any disturbance of the self-centering of drive element 11 relative to operating element 10.

Figure 4B:
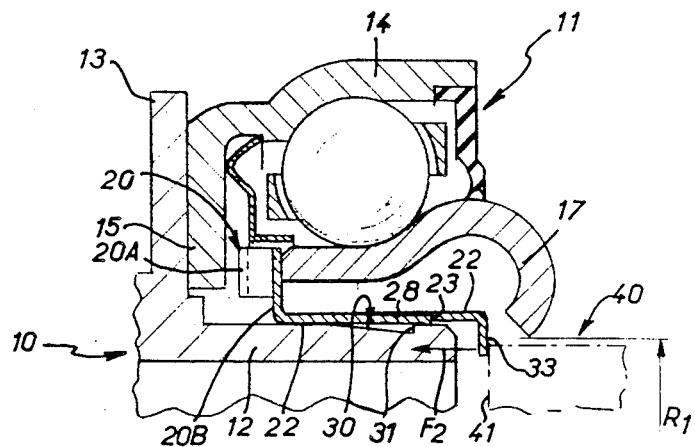

When, during its axial engagement on operating element 10, drive element 11 abuts by its flanged edge 15 against flange 13, FIG. 4B, the appropriate axial engagement of the elastic washer 20 is completed, by acting appropriately on flange 33 of its lugs 22, as is shown schematically by arrow F2 in FIG. 4B.

For example, as is shown by the dotted lines in FIG. 4B, this action on return 33 can preferably be performed with the aid of a tool 40, presenting transversely in relation to the axis of the assembly, a flat application edge 41, this tool having peripherally, for access to flange 33 of lugs 22, a radius at most equal to the radius R1 of the inner periphery of the operating flanged edge 17, and, in practice, slightly less than this. It is due the presence of flange 33 that it is thus possible to act axially on the lugs 22.

The complementary action of axial engagement thus exercised on the elastic washer 20 leads this to be applied by the rearward portion 20A of its undulations on the applied flanged edge 15.

When, the axial action on flange 33 being continued, the transverse shoulders 23 of these lugs 22, formed by the end edges of their tongues 28, become aligned with the transverse shoulders 31 of operating element 10, the tongues 28, constrained until then and now freed, tend to recover their initial resting configuration, engaging in channel 30 of sleeve 12, in such a way that their ends form arched abutments against the transverse shoulder 31 of the sleeve.

The elastic washer 20 then being applied by its transverse shoulders 23 on operating element 10, it presses the flanged edge 15 of drive element 11 elastically against flange 13 of operating element 10.

Elastic control of the axial application of drive element 11 against operating element 10 is thereafter assured, as well as its axial retention in relation to operating element 10.

In the embodiment shown in FIG. 5, the transverse shoulder 23 of each lug 22 is formed by the edge of a cut-out 45 by which lug 22 is engaged on a boss 46 of the operating element 10.

Each of these bosses 46 formed on the operating element 10 for each lug 22, projects radially on sleeve 12 and, on the side axially away from flange 13 makes an engagement face 47 generally inclined to the axis of the assembly and becoming progressively further from that axis as it approaches the flange 13.

Figure 6:
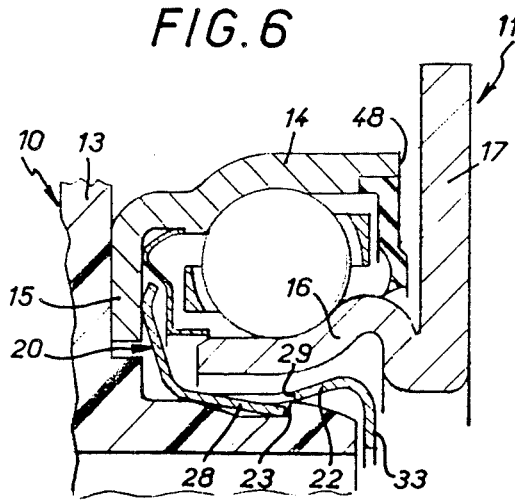

In the embodiment shown in FIG. 6, the axially-acting elastic washer 20 used is a generally frustoconical washer, of the Belleville washer kind, which, at one of its peripheries, in practice its outer periphery, bears axially on the applied flanged edge 15 of drive element 11, and which on its other periphery has, as before, at least one lug 22, by a transverse shoulder 23 of which it is held by the operating element 10. The transverse shoulder 23 of each of these lugs 22 is then formed either by the free end of a tongue 28 as in FIG. 1 to 4, or by a cut-out 45 as in FIG. 5.

The operating flanged edge 17 extends radially away from the axis of the assembly, and is essentially flat. For example, it can extend radially beyond the corresponding edge 48 of the outer race 14.

Figure 7:
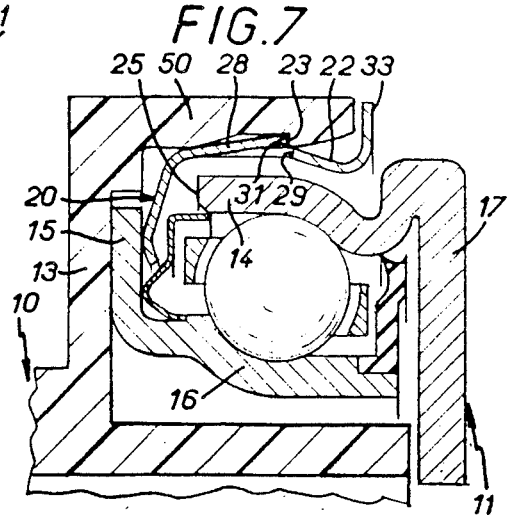

The washer flange provided in accordance with the invention is preferably designed not to increase the axial space required by the assembly. In the embodiment shown in FIG. 7, the applied flanged edge 15 is directed radially away from the axis of the assembly whilst the operating flanged edge 17 is directed radially towards this axis.

Furthermore, the shoulder 31 belongs to an axial extension 50 with which the operating element 10 is formed projecting axially at the outer periphery of flange 13; in this case the lugs 22 extend at the outer periphery of the elastic washer 20 and the flange 33 provided in accordance with the invention extends radially away from the axis of the assembly. The arrangements shown are otherwise like those described with reference to FIG. 6, although those described with reference to FIGS. 1 to 5 would also be suitable.

In particular, when the axially-acting elastic washer used is a Belleville washer, it can equally have a continuously circular external periphery or one notched to form lugs.

In addition it must be understood that a right angled flange 33 does not necessarily mean herein a flange which extends rigorously perpendicular to the lug concerned, but on the contrary it may extend only substantially perpendicularly to the lug, and may even be more or less inclined thereto.

What is claimed is:

1. A clutch release bearing assembly comprising an operating element adapted to be subject to the action of a control device, and a drive element applied either directly or indirectly axially against said operating element and which said drive element is adapted to act on the release device of a clutch, said bearing assembly having an axis, said operating element having a transverse flange for the axial abutment of the drive element, and said drive element carrying transversely, for axial application to said flange, a flanged edge referred to hereinafter as an applied flanged edge; and an elastic washer adapted to apply said drive element to said operating element and to locate it axially with respect thereto, said elastic washer bearing axially on the drive element and having at least one lug provided with a transverse shoulder by which said elastic washer is retained by the operating element, said lug being prolonged beyond said transverse shoulder and being formed with a washer flange extending radially towards the axis of the assembly and beyond said shoulder.

2. A clutch release bearing assembly according to claim 1, wherein said operating element comprises a sleeve and said washer flange extends axially beyond the edge of said sleeve with respect to said transverse flange.

3. A clutch release bearing assembly according to claim 2, wherein said drive element comprises a bearing, and said applied flanged edge is formed on one race thereof, the other race thereof carrying a flanged edge adapted to act on the release device of a clutch, said flanged edge of the other race being directed generally radially towards the axis of the assembly, and being hereafter referred to as the operating flanged edge, and wherein said washer flange extends axially between the edge of said sleeve and said operating flanged edge and its free edge having a circumference of radius smaller than that of the circumference along which the inner periphery of said operating flanged edge extends.

4. A clutch release bearing assembly according to claim 3, wherein said inner periphery of said operating flanged edge itself extends along a circumference with a radius smaller than that of the circumference along which the outer surface of said sleeve extends.

5. A clutch release bearing assembly according to claim 1, wherein said transverse shoulder of said lug is formed by the edge of a radially elastically deformable tongue carried axially by said lug, said operating element comprises a sleeve, and said sleeve has on its outer surface a channel, and the side of said channel which is axially turned towards the flange of said operating element forms a shoulder with which the shoulder of said lug cooperates.

6. A clutch release bearing assembly according to claim 1, wherein the transverse shoulder of said lug is formed by the edge of a cut-out by which the said lug is engaged on a boss of the operating element.

7. A clutch release bearing assembly according to claim 6, wherein said operating element comprises a sleeve and the boss which it presents for cooperation with said lug projects radially from said sleeve and, on the side axially away from the flange of said operating element, presents an engagement face generally inclined to the axis of the assembly and becoming progressively further from that axis as it approaches said flange of said operating element.

8. A clutch release bearing assembly according to claim 1, wherein said washer flange on said lug is located at the end of said lug.

9. A clutch release bearing assembly according to claim 1, wherein said washer flange extends substantially at right angles to said lug.

* * * * *